Oct. 17, 1944.  C. W. CRUMRINE  2,360,651
ANIMAL TRAP
Filed July 9, 1943  3 Sheets-Sheet 1
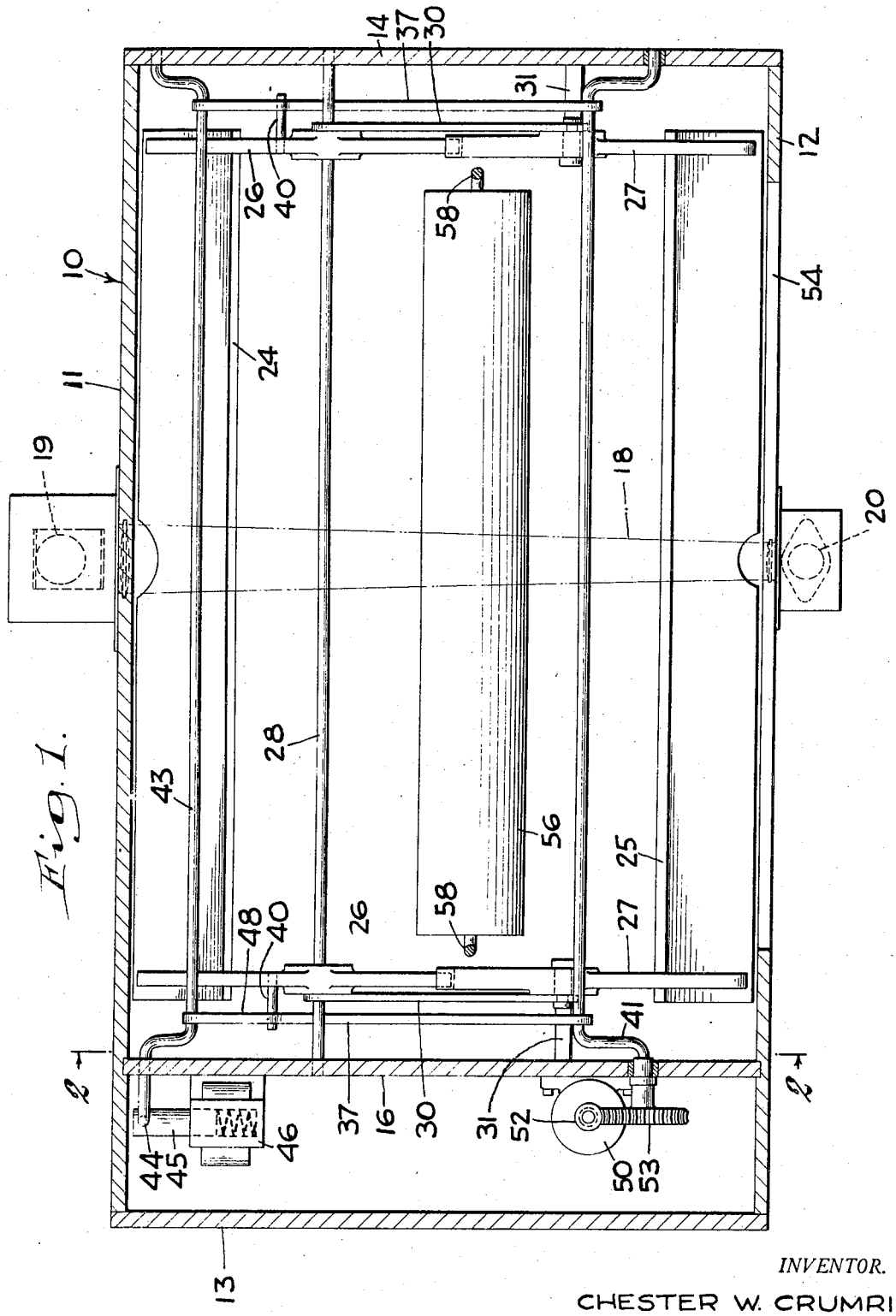
INVENTOR.
CHESTER W. CRUMRINE
BY
Beau, Brooks, Buckley & Beau.
Attorneys.

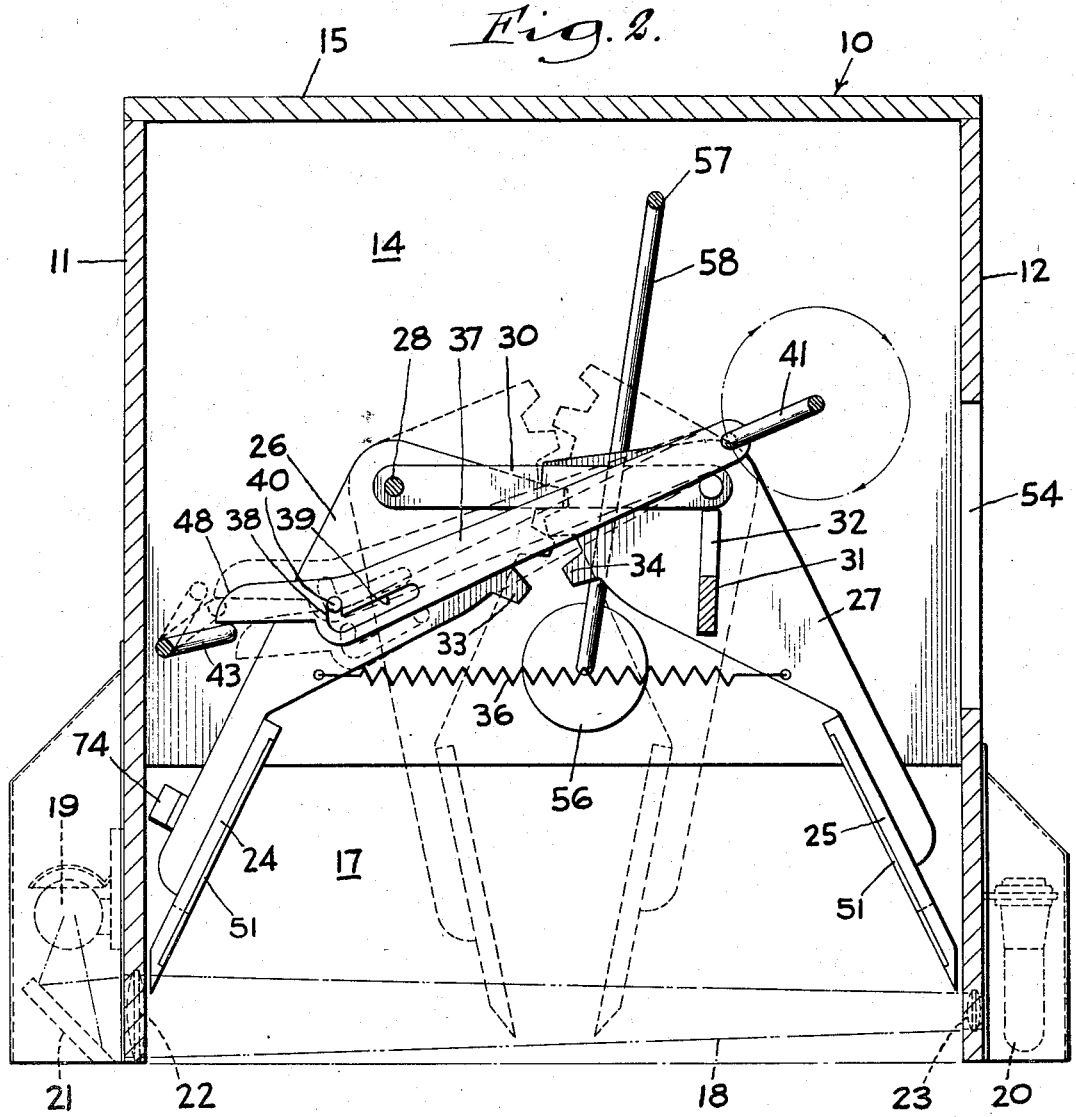

Oct. 17, 1944. C. W. CRUMRINE 2,360,651
ANIMAL TRAP
Filed July 9, 1943 3 Sheets-Sheet 3
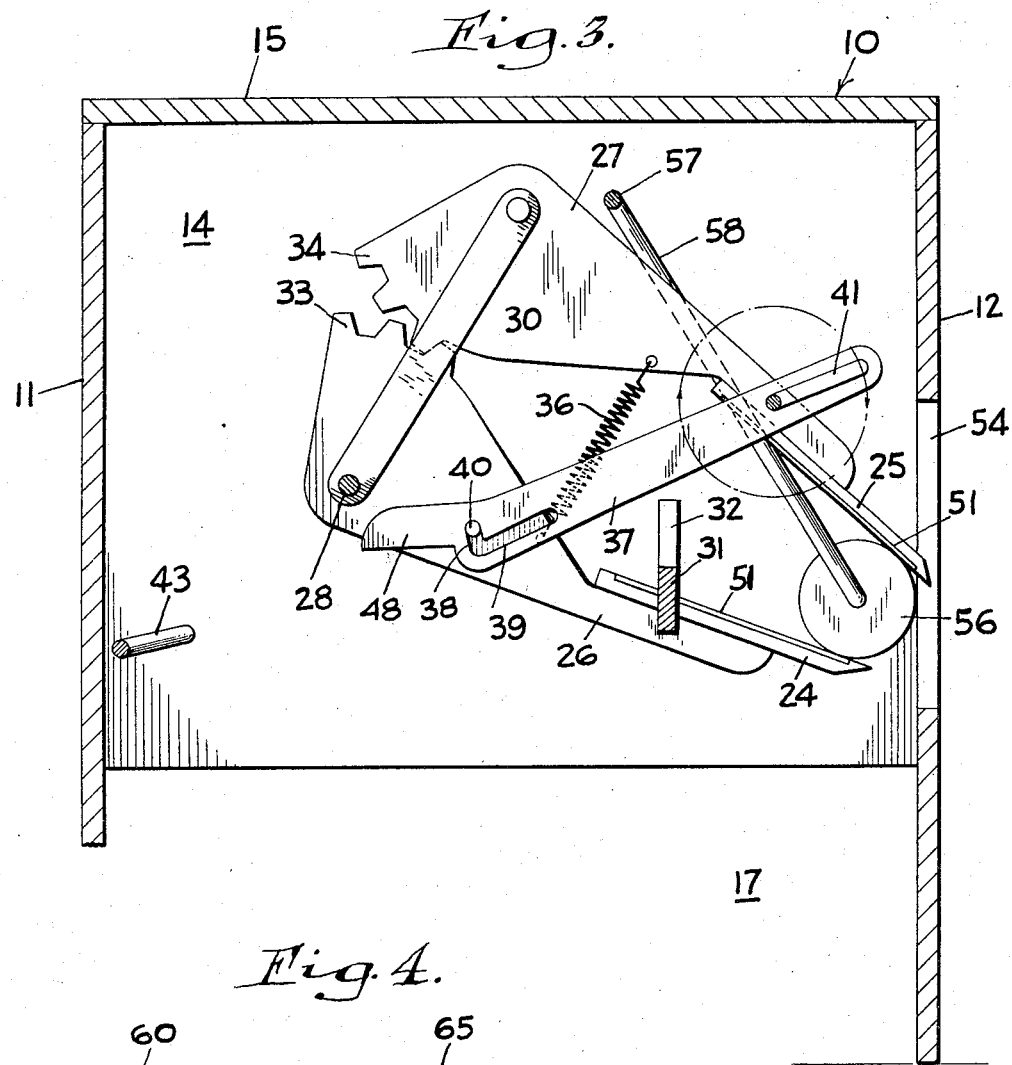
INVENTOR.
CHESTER W. CRUMRINE
BY
Beau, Brooks, Buckley & Beau.
Attorneys Patented Oct. 17, 1944

2,360,651

UNITED STATES PATENT OFFICE 2,360,651

ANIMAL TRAP

Chester W. Crumrine, Irondequoit Township, Monroe County, N. Y.

Application July 9, 1943, Serial No. 493,988

11 Claims. (Cl. 43—99)

This invention relates to animal traps and particularly to an animal trap having a fully automatic operating cycle including the steps of trapping animals, disposing of them, and returning the trap to condition for future trapping and disposing.

According to the present invention means are provided whereby, after an initial trapping impulse set off by the presence of an animal in a predetermined trapping zone, the successive electrocution of the animal, disposal of the body, and resetting of the various instrumentalities are carried on automatically and, what is of importance in these devices, quietly and in such manner as not to arouse the suspicion of other animals in the vicinity of the trap. Further, the operation of executing the animal by electrocution is carried on during the movement of the animal to a point of ejection from the initial trapping means, thereby shortening the length of the complete cycle. Various advantages of design, construction and operation will appear to those skilled in the art from a consideration of the ensuing specification and the accompanying drawings, which depict an exemplary embodiment of the principles of the present invention.

In the drawings:

Fig. 1 is a top plan view with the casing portion shown in cross-section;

Fig. 2 is a cross-sectional view taken on line 2—2 of Fig. 1;

Fig. 3 is a view similar to Fig. 2 but with the parts shown in another position of the cycle of trap operation; and, Fig. 4 is a wiring diagram showing the electrical connections for effecting a fully automatic trapping cycle of operation.

Throughout the several figures of the drawings, like characters of reference denote like parts and the numeral 10 designates generally a casing having side walls 11 and 12, end walls 13 and 14, and a top or closure 15. A transverse partition wall 16, see Fig. 1, is provided to give bearing support to certain of the moving parts of the device. It will be noted that the front and rear walls 13 and 14 stop substantially short of the floor or surface upon which the casing rests, whereby to provide a clear passageway 17 extending entirely through the device.

An animal passing through the passageway 17 interrupts a light beam 18 emanating from a light source 19 and normally impinging upon a light sensitive cell 20, such interruption being arranged to energize the trap for a cycle of trapping and resetting movement. In the instance illustrated, the light is reflected by means of a mirror 21 and it is preferred to use a filter, as at 22, whereby the light passing across the passageway 17 is invisible to the eye of an animal. A lens 23 in the side wall 12 is provided, merely to converge and concentrate the rays against the light sensitive element of the photoelectric cell 20.

The animal securing and disposing elements comprise a pair of opposed plate or panel members 24 and 25 which are mounted for swinging movement toward and away from each other by means of pairs of arms 26 and 27, respectively. The arms 26 are arranged to have a fixed pivot axis by reason of the provision of a pivot shaft 28 which is journaled at its ends in the rear wall 14 and the intermediate partition wall 16.

The arms 27 which support the plate 25 are pivotally attached to links 30. The opposite ends of the links 30 are pivoted to pivot shaft 28. It can be seen from the foregoing that the structure thus far described is not sufficient to retain the arms 27 in the position in which they are illustrated in full lines in Fig. 2. To support the arms 27 of the plate 25 in the illustrated position brackets 31 are secured to the opposed faces of the partition 16 and the rear wall 14 and these brackets have upstanding fingers 32 which engage the links 30 and, in the full line position of Fig. 2, prevent their clockwise rotation about the axis of the pivot shaft 28. Each of the arms 26 and 27 has a segmental gear portion, 33 and 34 respectively, so that the arms are constrained to move about their pivotal axes in synchronism.

As illustrated in full lines in Fig. 2, the trap is preset for a trapping operation and the plates 24 and 25, which are urged toward each other by a connecting tension spring 36, are held apart through the cooperation of a latch bar 37 which has a transverse slot portion 38 and a longitudinal slot portion 39. In latching position the transverse slot portion 38 engages pins 40 carried by the arms 26 and prevents pivotal movement of arms 26 and, through the inter-position of the segmental gear portions 33 and 34, the arms 27 also. The right hand end of latch bar 37 is pivotally carried by the throw of a crank 41 whose ends are journaled in the partition 16 and the rear wall 14. The latch 37 is maintained in the full line latching position of Fig. 2 merely by the force of gravity.

The latch release means comprises a crank 43 which is likewise journaled in the partition 16 and the rear wall 14 and has a downward extension 44 for engagement with an armature 45 which is arranged to be attracted by energization of an electromagnet 46, Fig. 1. Energization of the electromagnet is thus arranged to produce counter-clockwise movement of the crank 43 as viewed in Figs. 2 and 3 and the crank engages a nose or extension 48 of the latch bar 37 to raise the same to the upper dotted line position. This brings the longitudinal slot 39 into registry with the pin 40 and releases the arms 26 and 27 and the plates 24 and 25 for movement toward each other under the impetus of the spring 36, to the dotted line position of Fig. 2. This movement is effected with extreme rapidity and with the result that an animal trapped in the passageway is confined and held between the plates 24 and 25.

Energization of the electromagnet 46 is merely momentary but simultaneously therewith a circuit is closed for an electric motor 50 and another circuit is closed to energize electrocuting electrodes 51 carried by the opposed faces of plates 24 and 25. The circuit for the motor 50 and the electrocuting circuit are maintained throughout a full operating cycle of the trap, including the phase of disposing of the animal body and the restoration of the parts to their initial preset position. The motor 50 is provided with a worm 52 which drives a worm wheel 53 secured to the pivot shaft of the crank 41, so that the crank 41 is given a clockwise rotation during each trapping, disposing and resetting cycle.

Beginning with the parts in full line position of Fig. 2, the first part of the rotation of the crank 41 (slightly less than 90°) will move the latch 37 to the right until the transverse slot portion 38 registers with the pin 40 whereupon the latch will drop at its left and subsequent movement of the latch bar 37 to the right during continued rotation of the crank 41 will rotate the arm 26 clockwise to the position illustrated in full lines in Fig. 3. Since the arms 26 and 27 cannot, at this time, rotate toward each other any further due to the presence of the animal body between the plates 24 and 25, the entire assembly, including the arms 26 and 27, the plates 24 and 25 and the links 30 will rotate about the pivot shaft 28 to the position illustrated in Fig. 3. This brings the plates 24 and 25 into proximity with an opening 54 in the side wall 12 of the casing and the animal body is ejected from between the plates 24 and 25 and projected through the opening 54 in a manner which will now appear.

The numeral 56 designates a roll which is suspended from a pivot shaft 57 by means of a pair of arms 58. The pivot axis 57 is so disposed with respect to the pivot shaft 28, and the respective lever arms are so proportioned, that rotation of the arm assembly from the dotted line position of Fig. 2 to the full line position of Fig. 3 forces the roll 56 between the plates 24 and 25 and ejects the animal from between the plates. This may or may not be accompanied by a partial opening movement of the plates 24 and 25 depending upon the size of the animal engaged between the plates.

It is believed obvious that continued rotation of the crank 41 during the latter half of its cycle of operation results first in restoration of the parts to the dotted line position of Fig. 2 and, when the free end of the link 30 strikes the upstanding fingers 32, produces continued clockwise rotation of the arm 26 and plate 24 to the full line position of Fig. 2. The latter movement, by reason of the gear connection between the arms 26 and 27, also restores the arms 27 and the plate 25 to the full line position of Fig. 2 and, incidentally, places the spring 36 under its initial tension for subsequent trapping operations.

The manner in which the foregoing operation is effected electrically will be understood from a consideration of the wiring diagram comprising Fig. 4, wherein the numerals 60 and 61 designate the leads of any convenient power supply, as for instance an ordinary alternating current domestic or industrial power source. As indicated in Fig. 4 the motor 50 and the electromagnet 46 are connected in parallel across the power supply 60, 61 by means of conductors 63 and 64, respectively.

A switch 65 is adapted to be momentarily closed by interruption of the light beam across the trapping zone.

The manner in which the interruption of the light beam momentarily closes switch 65 is known to those skilled in the electrical art and may be effected by the use of a photoelectric relay, which is a commercial unit for electronically magnifying the photoelectric effect and utilizing such effect to control the condition of a microswitch, such as the one designated 65 in Fig. 4. It will be seen that closure of switch 65 energizes electromagnet 46 which attracts the armature 45 and operates latch 37 to release the arms 26 and, consequently, the arms 27.

The switch 65 is in series with both of the shunt circuits 63 and 64 so that closure thereof likewise energizes a holding coil 66 having a core 67 which acts to attract and close a normally open switch 68 in a holding circuit branch 69. It is thus seen that even though closure of the switch 65 be momentary, the effective portion of circuit 63, including motor 50, will remain energized through the holding circuit branch 69. The effective portion of circuit 63 will remain energized as long as the holding coil 66 is energized to hold the normally open switch 68 in closed position. Circuit 63 also includes a primary transformer winding 70, the secondary 71 of which is connected in series with the pair of electrocuting electrodes 51.

The circuit 63 includes a normally closed switch 74 but this switch, as appears from Fig. 2, is so located as to be held in open position by one of the arms 26 when the arms 26 are in idle, preset position. When the trap is sprung the switch 74 immediately closes and remains closed during the duration of the full trapping cycle and until the arms 26 reach their final position at the conclusion of a trapping cycle, whereupon switch 74 opens, holding coil 66 is de-energized, normally open switch 68 further opens circuit 63, and the trap is set and ready to begin a subsequent trapping operation whenever the trapping light beam is again interrupted by the presence of an animal thereacross.

While a single specific embodiment of the invention has been shown in the drawings and described in detail herein by way of example, it is to be understood that the invention is not limited thereto, nor otherwise than as defined in the appended claims.

I claim:

1. An animal trap comprising a casing having a trapping zone and a disposal zone, a pair of depending members swingable toward each other to trap an animal therebetween in said trapping zone, means for swinging said members toward each other and for bodily moving said depending members as a unit to move an animal held therebetween to said disposal zone, and means operable automatically by movement of said members to said disposal zone for releasing the animal body from between said members.

2. An animal trap comprising a casing having a trapping zone and a disposal zone, a pair of depending members swingable toward each other about spaced parallel axes to trap an animal therebetween in said trapping zone, means for swinging said members toward each other and for pivoting said depending members as a unit about one of said axes to move an animal held therebetween to said disposal zone, and means operable automatically by movement of said members to said disposal zone for releasing the animal body from between said members.

3. An animal trap comprising a casing having a trapping zone and a disposal zone, a pair of depending members swingable toward each other to trap an animal therebetween in said trapping zone, means for swinging said members toward each other and for bodily moving said depending members as a unit to move an animal held therebetween to said disposal zone, means operable automatically by movement of said members to said disposal zone for releasing the animal body from between said members, and electrical means for initiating and completing a cycle of trapping and disposing movement and including an animal-electrocuting circuit, said depending swingable members comprising opposed electrodes in said circuit.

4. An animal trap comprising a casing having a trapping zone and a disposal zone, a pair of depending members swingable toward each other about spaced parallel axes to trap an animal therebetween in said trapping zone, means for swinging said members toward each other and for pivoting said depending members as a unit about one of said axes to move an animal held therebetween to said disposal zone, means operable automatically by movement of said members to said disposal zone for releasing the animal body from between said members, and electrical means for initiating and completing a cycle of trapping and disposing movement and including an animal-electrocuting circuit, said depending swingable members comprising opposed electrodes in said circuit.

5. An animal trap comprising a casing having a trapping zone and a disposal zone, a pair of depending trapping members, one of said trapping members being mounted for movement about a fixed pivot axis, and link means connecting the other of said members to said first trapping member for pivotal movement of said other member and for revolution thereof about said fixed axis, means causing said members to pivot toward each other to secure an animal therebetween and rotate as a unit about said fixed axis to move the secured animal to said disposal zone, and means for releasing the animal body at the disposal zone.

6. An animal trap comprising a casing having a trapping zone and a disposal zone, a pair of depending trapping members, one of said trapping members being mounted for movement about a fixed pivot axis, link means connecting the other of said members to said first trapping member for pivotal movement of said other member and for revolution thereof about said fixed axis, means causing said members to pivot toward each other to secure an animal therebetween and rotate as a unit about said fixed axis to move the secured animal to said disposal zone, and freely depending means automatically engageable between said members upon movement thereof to said disposal zone to positively release the animal body from between said members.

7. An animal trap comprising a casing having a trapping zone and a disposal zone, a pair of depending members swingable toward each other to trap an animal therebetween in said trapping zone, means for swinging said members toward each other and for bodily moving said depending members as a unit to move an animal held therebetween to said disposal zone, and means operable automatically by movement of said members to said disposal zone for releasing the animal body from between said members, and electrical means for initiating and completing a cycle of trapping and disposing movement and including an animal-electrocuting circuit, said depending swingable members comprising opposed electrodes in said circuit.

8. An animal trap comprising a casing having a trapping zone and a disposal zone, a pair of depending members swingable toward each other to trap an animal therebetween in said trapping zone, means for bodily moving said depending members as a unit to move an animal held therebetween to said disposal zone, means operable automatically by movement of said members to said disposal zone for releasing the animal body from between said members, resilient means for urging said depending members toward each other, latch means for holding said members in separated pre-set position, and electrical means for releasing said latch upon the presence of an animal in the trapping zone, said latch being automatically operable upon release to move said depending members to said disposal zone and return them to the trapping zone and separate and latch said members for a future trapping operation.

9. An animal trap comprising a casing having a trapping zone and a disposal zone, a pair of depending members swingable toward each other about spaced parallel axes to trap an animal therebetween in said trapping zone, means for swinging said members toward each other and for pivoting said depending members as a unit about one of said axes to move an animal held therebetween to said disposal zone, and means operable automatically by movement of said members to said disposal zone for releasing the animal body from between said members, said means comprising a suspended member constrained for movement in a predetermined arc and disposed in the path of movement of said members to the disposing zone whereby to automatically engage between said members and remove an animal body from therebetween.

10. An animal trap comprising a casing having a trapping zone and a disposal zone, a pair of depending trapping members, one of said trapping members being mounted for movement about a fixed pivot axis, link means connecting the other of said members to said first trapping member for pivotal movement of said other member and for revolution thereof about said fixed axis, means causing said members to pivot toward each other to secure an animal therebetween and rotate as a unit about said fixed axis to move the secured animal to said disposal zone, and means for releasing an animal from between said trapping members, said last mentioned means comprising a suspended member constrained for movement in a predetermined arc and disposed in the path of movement of said members to the disposing zone whereby to automatically engage between said members and remove an animal body from therebetween.

11. An animal trap comprising a casing having a trapping zone and a disposal zone, a pair of depending trapping members, one of said trapping members being mounted for movement about a fixed pivot axis, link means connecting the other of said members to said first trapping member for pivotal movement of said other member and for revolution thereof about said fixed axis, means causing said members to pivot toward each other to secure an animal therebetween and rotate as a unit about said fixed axis to move the secured animal to said disposal zone, resilient means for urging said depending members toward each other, latch means for holding said members in separated pre-set position, and electrical means for releasing said latch upon the presence of an animal in the trapping zone, said latch being automatically operable upon release to move said depending members to said disposal zone and return them to the trapping zone and separate and latch said members for a future trapping operation, and means for releasing the animal body at the disposal zone.

CHESTER W. CRUMRINE.